United States Patent
Ben-Itzhak et al.

(10) Patent No.: US 11,748,668 B2
(45) Date of Patent: Sep. 5, 2023

(54) INTERNAL LOAD BALANCER FOR TREE-BASED ENSEMBLE CLASSIFIERS

(71) Applicant: VMware, Inc., Palo Alto, CA (US)

(72) Inventors: Yaniv Ben-Itzhak, Afek (IL); Shay Vargaftik, Nazareth-Illit (IL)

(73) Assignee: VMware, Inc., Palo Alto, CA (US)

( * ) Notice: Subject to any disclaimer, the term of this patent is extended or adjusted under 35 U.S.C. 154(b) by 493 days.

(21) Appl. No.: 16/923,988

(22) Filed: Jul. 8, 2020

(65) Prior Publication Data

US 2022/0012550 A1    Jan. 13, 2022

(51) Int. Cl.
    G06N 20/20      (2019.01)
    G06F 9/50       (2006.01)
    G06F 18/243     (2023.01)
    G06F 18/214     (2023.01)
    G06F 18/21      (2023.01)

(52) U.S. Cl.
    CPC ............ *G06N 20/20* (2019.01); *G06F 9/505* (2013.01); *G06F 9/5083* (2013.01); *G06F 18/214* (2023.01); *G06F 18/2185* (2023.01); *G06F 18/24323* (2023.01)

(58) Field of Classification Search
    None
    See application file for complete search history.

(56) References Cited

U.S. PATENT DOCUMENTS

| | | | |
|---|---|---|---|
| 2020/0167640 A1* | 5/2020 | Sundareswara | G06N 3/08 |
| 2020/0182618 A1* | 6/2020 | Xu | G06F 18/214 |
| 2020/0210784 A1* | 7/2020 | Anuar Or | G06F 18/2115 |
| 2020/0364349 A1* | 11/2020 | Nunes | G06F 16/9536 |
| 2021/0073036 A1* | 3/2021 | Kim | G06N 3/04 |
| 2021/0097446 A1* | 4/2021 | Kim | G06F 16/285 |

FOREIGN PATENT DOCUMENTS

| | | | | |
|---|---|---|---|---|
| CN | 110458209 A | * | 11/2019 | G06F 21/56 |
| WO | WO-2018099767 A1 | * | 6/2018 | G06N 20/20 |
| WO | WO-2020235194 A1 | * | 11/2020 | G05B 19/418 |

* cited by examiner

*Primary Examiner* — Mohammed Rachedine

(57) ABSTRACT

Techniques for implementing a tree-based ensemble classifier comprising an internal load balancer are provided. In one set of embodiments, the tree-based ensemble classifier can receive a query data instance and select, via the internal load balancer, a subset of its decision trees for processing the query data instance. The tree-based ensemble classifier can then query each decision tree in the selected subset with the query data instance, combine the per-tree classifications generated by the subset trees to generate a subset classification, and determine whether a confidence level associated with the subset classification is sufficiently high. If the answer is yes, the tree-based ensemble classifier can output the subset classification as a final classification result for the query data instance. If the answer is no, the tree-based ensemble classifier can repeat the foregoing steps until a sufficient confidence level is reached or until all of its decision trees have been selected and queried.

18 Claims, 4 Drawing Sheets

INTERNAL LOAD BALANCER FOR TREE-BASED ENSEMBLE CLASSIFIERS

BACKGROUND

Tree-based ensemble methods are machine learning (ML) algorithms that are commonly used for carrying out classification, which is the task of predicting, from among a plurality of predefined categories (i.e., classes), the class to which a given data instance belongs. Tree-based ensemble methods generally involve (1) constructing a multitude of decision trees using a training data set and (2) at the time of receiving a query data instance to be classified, processing that query data instance using each of the multitude of decision trees (or in other words, "querying" each tree with the query data instance) and combining the individual tree outputs to generate a final classification result. Examples of well-known tree-based ensemble methods include random forest (which is based on bootstrap aggregation or "bagging"), adaptive boosting, and gradient boosting.

One issue with ML classification models that are created using tree-based ensemble methods (referred to herein as "tree-based ensemble classifiers") is that they often exhibit a large memory footprint due to the number of decision trees in each model, as well as the depth and total number of nodes in each tree. Thus, tree-based ensemble classifiers typically incur a high cache miss rate when performing classification, which undesirably results in high latency and low throughput.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing an internal load balancer within a tree-based ensemble classifier such as a random forest classifier, an adaptive boosting classifier, etc. At a high level, this internal load balancer enables the tree-based ensemble classifier to select and query a subset of its decision trees for a query data instance. If a confidence level for the aggregated classification generated by the selected subset of decision trees is deemed to be sufficiently high, the tree-based ensemble classifier can return that classification as the final classification result for the query data instance. Otherwise, the tree-based ensemble classifier can select and query another, different subset of decision trees and repeat the foregoing process until a sufficient aggregated confidence level is achieved (or until all trees are queried). This aggregated confidence level refers to the combined confidence levels of all of the tree subsets queried to that point.

In the worst case, the internal load balancer will cause the tree-based ensemble classifier to query all of its decision trees in order to arrive at the final classification result, which is the same as conventional tree-based ensemble methods. However, on average, the internal load balancer will allow the tree-based ensemble classifier to query significantly fewer than its total number of decision trees, which advantageously results in lower classification latency and higher classification throughput. The foregoing and other aspects of the present disclosure are described in further detail below.

2. Model Architecture

Figure 1:
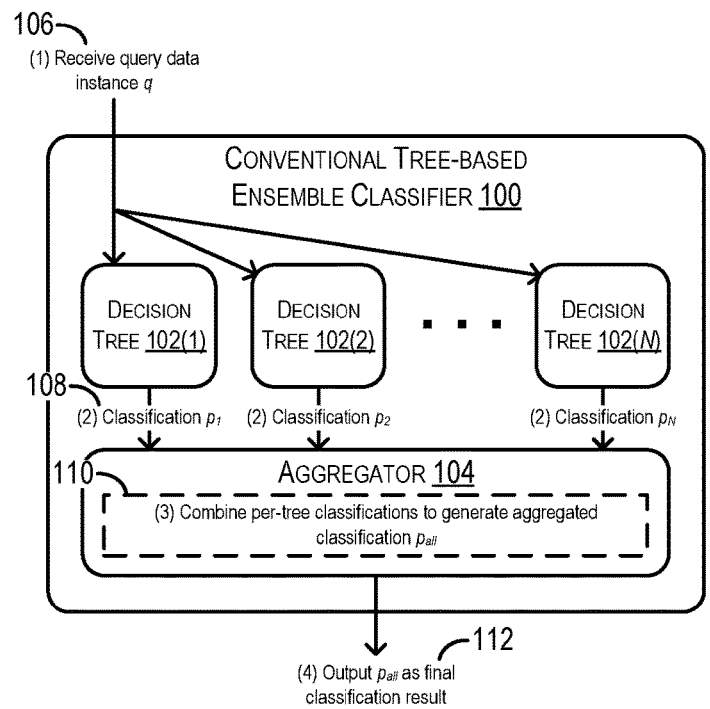
FIG. 1 depicts a conventional tree-based ensemble classifier.

To provide context for the embodiments presented herein, FIG. 1 depicts a conventional tree-based ensemble classifier 100 comprising a plurality of decision trees 102(1)-(N) and an aggregator component 104. As mentioned previously, a tree-based ensemble classifier is an ML classification model that is created using a tree-based ensemble method such as random forest, adaptive boosting, or the like.

In operation, at the time of receiving a query data instance q to be classified, tree-based ensemble classifier 100 can pass q to each of its decision trees 102(1)-(N) (step (1); reference numeral 106). Upon receiving q, each decision tree 102(i) can generate and output a classification $p_i$ for q where i=1 . . . N (step (2); reference numeral 108). For example, in the scenario where tree-based ensemble classifier 100 is a random forest classifier configured to distinguish among k classes, each decision tree 102(i) can output a class distribution vector of k elements where each vector element indicates the probability that the corresponding class is the correct classification for q (and where the top-1 class in the vector is the predicted classification).

Once all of the decision trees have output a predicted classification for q, aggregator component 104 can combine the per-tree classifications $p_1$ . . . $p_N$ to synthesize an aggregated classification pall (step (3); reference numeral 110). In the example above where tree-based ensemble classifier 100 is a random forest classifier, this step can comprise computing an average of the class distribution vectors output by each decision tree. Finally, tree-based ensemble classifier 100 can output pall as the final classification result for q at step (4) (reference numeral 112).

As noted in the Background section, one issue with conventional tree-based ensemble classifiers such as classifier 100 of FIG. 1 is that they can have a large memory footprint due to being composed of a large number of decision trees with large depth and/or high total node counts. For instance, in some use cases it is not uncommon for such classifiers to comprise hundreds or thousands of decision trees. This large memory footprint means that the tree-based ensemble classifier is more prone to incurring cache misses at the time of classification (due to the need to swap decision trees in and out of cache in order to query all of the trees), which in turn reduces the throughput and increases the latency of the classification task.

Figure 2:
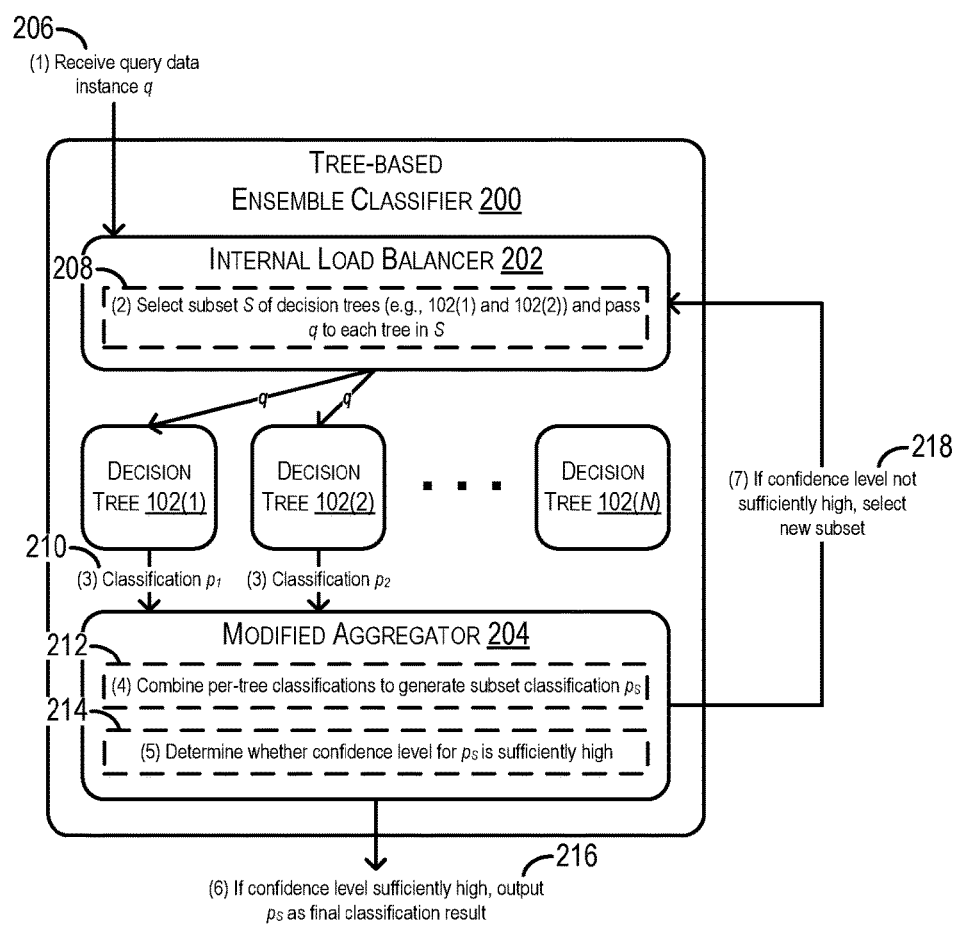
FIG. 2 depicts a tree-based ensemble classifier comprising an internal load balancer according to certain embodiments.

To address the foregoing and other similar issues, FIG. 2 depicts an enhanced version of tree-based ensemble classifier 100 of FIG. 1 (i.e., tree-based ensemble classifier 200) that comprises a novel internal load balancer 202 and a modified aggregator component 204 in accordance with certain embodiments. Internal load balancer 202 and modified aggregator component 204 may be implemented in software, in hardware, or a combination thereof. Generally speaking, components 202 and 204 enable tree-based ensemble classifier 200 to perform classification by sequentially querying one or more subsets of its decision trees 102(1)-(N), rather querying all N of the trees as required by conventional predictor 100 of FIG. 1.

For example as shown in FIG. 2, at the time of receiving a query data instance q (step (1); reference numeral 206), internal load balancer 202 of classifier 200 can select a subset S of decision trees 102(1)-(N) having size M<N (e.g., trees 102(1) and 102(2)) and pass q to each tree in S (step (2); reference numeral 208). The particular manner in which this selection is performed can vary depending on the implementation (e.g., randomly, based on per-tree load, based on the contents or type of q, based on the previous accuracy of certain trees or subsets of trees, or based on any other ML or reinforcement learning (RL) technique that adapts the tree subsets according to its previous results/history).

At step (3) (reference numeral 210), each decision tree in S can process q and output a classification $p_i$ for q where i=1 . . . M. Aggregator 204 can then combine $p_1$ through $p_M$ (as well as the classifications of previously selected subsets) to synthesize a subset-level classification $p_S$ (step (4); reference numeral 212) and determine whether a confidence level associated with $p_S$ is sufficiently high (step (5); reference numeral 214). This confidence level check indicates whether $p_S$ is likely to be the correct classification for q.

If the confidence level for $p_S$ is determined to be sufficiently high at step (5), tree-based ensemble classifier 200 can output $p_S$ as the final classification result for q and the classification task can end (step (6); reference numeral 216). On the other hand, if the confidence level for $p_S$ is not high enough, control can return to internal load balancer 202 so that internal load balancer 202 can select a new, different subset of decision trees (step (7); reference numeral 218). The foregoing steps can then be repeated until a sufficient confidence level is reached or until all N of the decision trees have been selected and queried.

With the high-level architecture and approach described above, a number of benefits are achieved. First, because tree-based ensemble classifier 200 can stop its classification processing as soon as a subset-level classification is deemed to be "likely" (i.e., have a sufficiently high confidence level), this architecture/approach enables classifier 200 to reduce, on average, the number of decision trees that it will query per query data instance. In systems with caches, this reduces the number of decision trees that need to be brought into system cache during the classification task, which (depending on cache size and total tree number/size N) can result in higher classification throughput and lower classification latency when compared to conventional classifier 100 of FIG. 1. Further, this reduces the total amount of computation needed for classification, which holds for all systems, regardless of whether they employ a cache or not.

Second, the architecture and approach shown in FIG. 2 allows for a number of extensions/enhancements that can further improve the performance of tree-based ensemble classifier 200. For example, in one set of embodiments (described in section (4) below) tree-based ensemble classifier 200 can detect decision trees (or subsets of trees) that are "inaccurate"—in other words, trees whose classifications are incorrect for a threshold number of training or query data instances. These inaccurate trees/subsets can be removed from the classifier and replaced with new trees/subsets via retraining. In another set of embodiments (described in section (5) below), tree-based ensemble classifier 200 can act upon multiple query data instances in parallel, such that each query data instance is concurrently processed by a different subset of decision trees. In yet another set of embodiments (described in section (6) below), tree-based ensemble classifier 200 can take advantage of per-tree weight values that are generated by boosting methods such as adaptive boosting in order to further inform/control subset selection.

It should be appreciated that the model architecture depicted in FIG. 2 is illustrative and not intended to limit embodiments of the present disclosure. For example, although tree-based ensemble classifier 200 is generally assumed to be a singular entity that is run on a single computing device/system, in some embodiments the various components of classifier 200 (e.g., internal load balancer 202, decision trees 102(1)-(N), aggregator 204) may be distributed across multiple computing devices/systems for enhanced performance, reliability, fault tolerance, or other reasons. In addition, although FIG. 2 depicts a particular arrangement of these components, other arrangements are possible (e.g., the functionality attributed to a particular component may be split into multiple components, components may be combined, etc.), and each component may include sub-components or implement functions that are not specifically described. One of ordinary skill in the art will recognize other variations, modifications, and alternatives.

3. Classification Workflow

Figure 3:
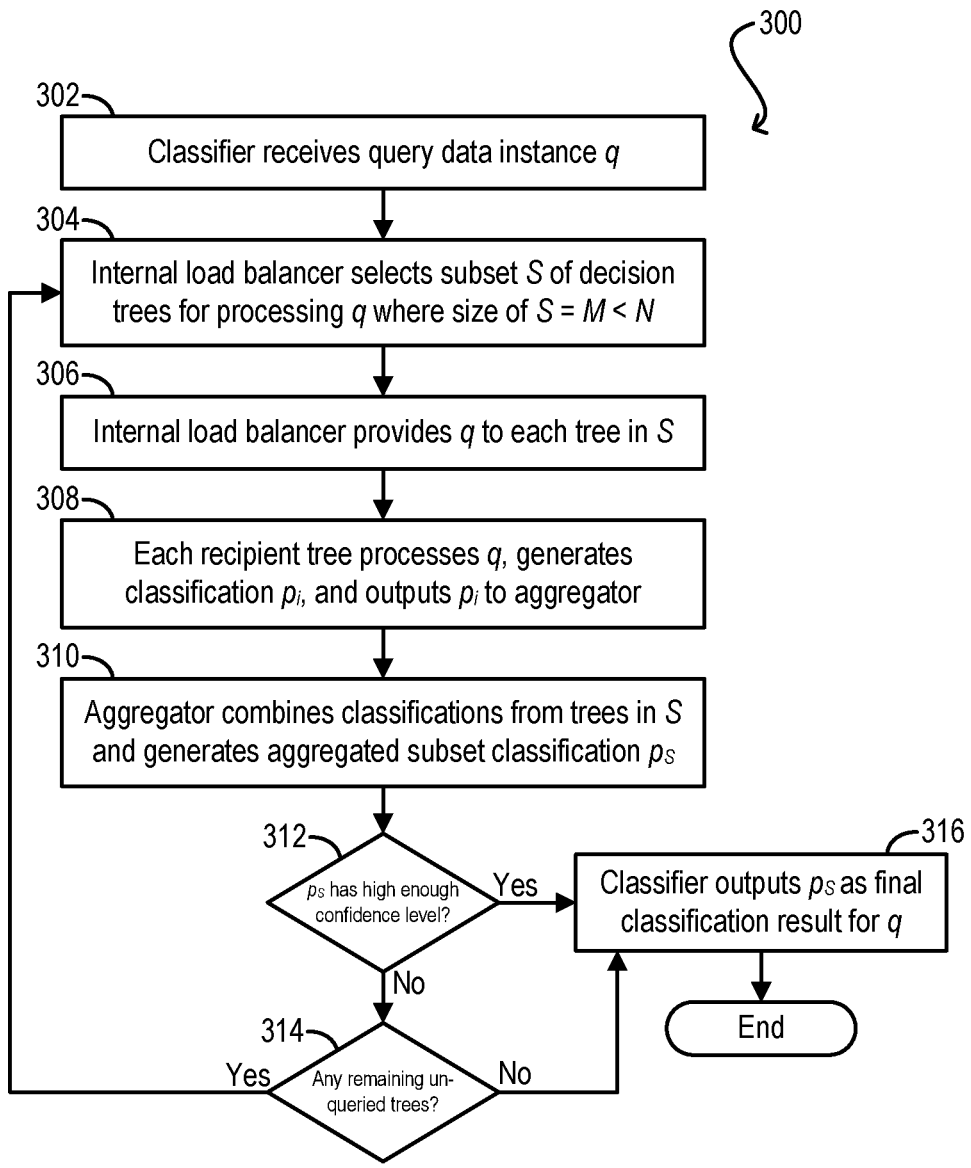
FIG. 3 depicts a classification workflow according to certain embodiments.

FIG. 3 depicts a workflow 300 that provides additional details regarding the processing that may be performed by tree-based ensemble classifier 200 of FIG. 2 (and its constituent internal load balancer 202, decision trees 102(1)-(N), and aggregator 204) for classifying a given query data instance q according to certain embodiments. As used herein, a "workflow" refers to a series of actions or steps that may be taken by one or more entities (in this case, classifier 200 and its components 202, 102(1)-(N), and 204). Workflow 300 assumes that tree-based ensemble classifier 200 has been trained using an initial set of training (i.e., labeled) data instances.

Starting with blocks 302 and 304, tree-based ensemble classifier 200 can receive query data instance q and internal load balancer 202 can select a subset S of decision trees 102(1)-(N) for processing q, where the size of S is M<N. For example, if there are 1000 total decision trees, M may be 10 or 100. The exact value for M may be configurable by a user based upon, e.g., the characteristics of the computer system executing tree-based ensemble classifier 200 and/or the characteristics of the data set being queried.

In one set of embodiments, internal load balancer 202 can perform the subset selection at block 304 by sampling decision trees at random from the entire set of N trees. In another set of embodiments, internal load balancer 202 can perform the subset selection at block 304 in a manner that attempts to balance load across decision trees 102(1)-(N). For instance, assume each decision tree is associated with a queue comprising query data instances that are waiting to be processed by that tree. In this scenario, internal load balancer 202 may examine these queues and select the M decision trees with the smallest queues.

In yet another set of embodiments, internal load balancer 202 can perform the subset selection at block 304 in a deterministic manner, such that a given query data instance is always assigned to the same subset. For example, in these embodiments decision trees 102(1)-(N) may be divided into a predetermined number of subsets 0 . . . X−1 and internal load balancer 202 may select subset S by computing a hash of the content of q, modulo X. This selection approach advantageously ensures that the final classification result generated by predictor 200 for q will be consistent across multiple execution runs in which a query data set including q is received, which is desirable for certain use cases.

In yet another set of embodiments, internal load balancer 202 can perform the subset selection at block 304 based on the accuracy of certain decision trees or subsets, where "accuracy" refers to how often those trees/subsets returned correct classifications for similar query data instances (i.e., query data instances of the same type) in the past. For instance, if q comprises information derived from a network data packet and if internal load balancer 202 knows that decision trees 102(1), 102(2), and 102(3) have been highly accurate for classifying previous network data packet queries, internal load balancer 202 may select these three trees as part of an initial subset for q in order to try and generate an accurate classification for q as soon as possible.

The particular mechanism by which internal load balancer 202 determines this accuracy information can vary. For example, in one embodiment internal load balancer 202 can consult a data store mapping relationships between query data types and associated trees/subsets that are deemed accurate for those types. In an alternative embodiment, internal load balancer 202 may provide q as input to another ML model which is trained to identify the accurate trees/subsets for q.

Once internal load balancer 202 has selected subset S, internal load balancer 202 can provide q to each decision tree in the subset (block 306). In response, each recipient decision tree can process q in accordance with its internal tree structure, generate a classification $p_i$ for q where i=1 . . . M, and output classification $p_i$ to aggregator 204 (block 308). As mentioned previously, the specific format of $p_i$, can differ depending on the nature of tree-based ensemble classifier 200. For example, if classifier 200 is a random forest classifier, each $p_i$ may be a class distribution vector comprising probability values indicating the likelihood that q is an instance of the corresponding class.

At block 310, aggregator 204 can combine the classifications $p_i$ received from each decision tree in subset S and generate a single, subset-level classification $p_S$ corresponding to the aggregated classification determined by the entire subset. In certain embodiments, this combining step can comprise computing an average or mode of the various per-tree classifications $p_i$.

Aggregator 204 can then check whether subset-level classification $p_S$ has a sufficiently high confidence level, where "confidence level" refers to the likelihood that $p_S$ represents the correct classification for q (block 312). In one set of embodiments, this confidence level check can involve determining whether the probability value associated with $p_S$ (or the top-1 class in the scenario where $p_S$ is a class distribution vector) meets or exceeds a predefined threshold (e.g., 0.7). In another set of embodiments, the confidence level check at block 316 can based on other factors/criteria, such as whether a majority of decision trees in S voted for (i.e., predicted) the sub set-level classification $p_S$.

If the answer at block 312 is yes, aggregator 204 can conclude that $p_S$ is sufficiently likely to be correct and can output $p_S$ as the final classification result for q (block 314), thereby ending the classification task (and avoiding the need to query any further trees/subsets of tree-based ensemble classifier 200).

If the answer at block 312 is no, aggregator 204 can further check whether that are any additional decision trees in tree-based ensemble classifier 200 that have not yet been queried (block 316). If there are no un-queried decision trees, aggregator 204 can output $p_S$ as the final classification result for q per block 318 above.

However, if there are one or more un-queried decision trees, workflow 300 can return to block 304 so that internal load balancer 202 can select a new subset of decision trees. This process can repeat until a subset-level classification is generated that has a sufficiently high confidence level (per block 312) or all decision trees have been queried (per block 316).

It should be noted that for each subsequent iteration of blocks 304-316, the subset-level classification $p_S$ generated at block 310 can be based on both the per-tree classifications $p_i$ of the current subset S and the subset-level classifications of previously selected subsets. This ensures that as each additional subset is considered, all previously selected subsets are also taken into account and incorporated into $p_S$. Further, although workflow 300 assumes that the size of subset S (i.e., M) is a predetermined number, in some embodiments M may dynamically change on a per-query basis based on one or more factors (e.g., query type, etc.). Yet further, in the scenario where N is not evenly divisible by M and tree-based ensemble classifier 200 ends up querying all of its decision trees 102(1)-(N), the size of the last subset selected by internal load balancer 202 will be smaller than M.

4. Identifying and Replacing Inaccurate Trees

One consequence of carrying out classification using subsets of decision trees as described above is that it is relatively straightforward to identify particular subsets that are inaccurate (i.e., have a tendency generate an incorrect classification). In certain embodiments, these inaccurate trees can be removed, or "pruned," from tree-based ensemble classifier 200 and replaced with new trees by re-training classifier 200, thereby improving its classification performance.

Figure 4:
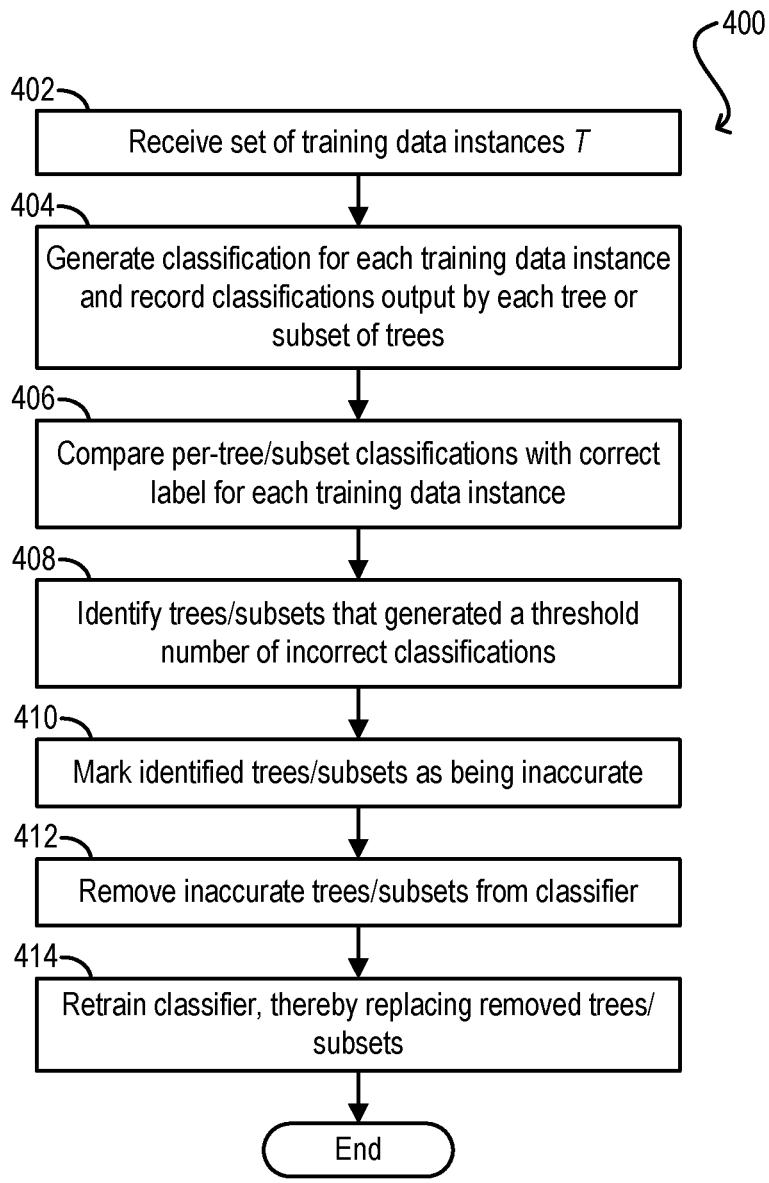
FIG. 4 depicts a workflow for identifying and retraining inaccurate trees/subsets in an offline fashion according to certain embodiments.
Figure 5:
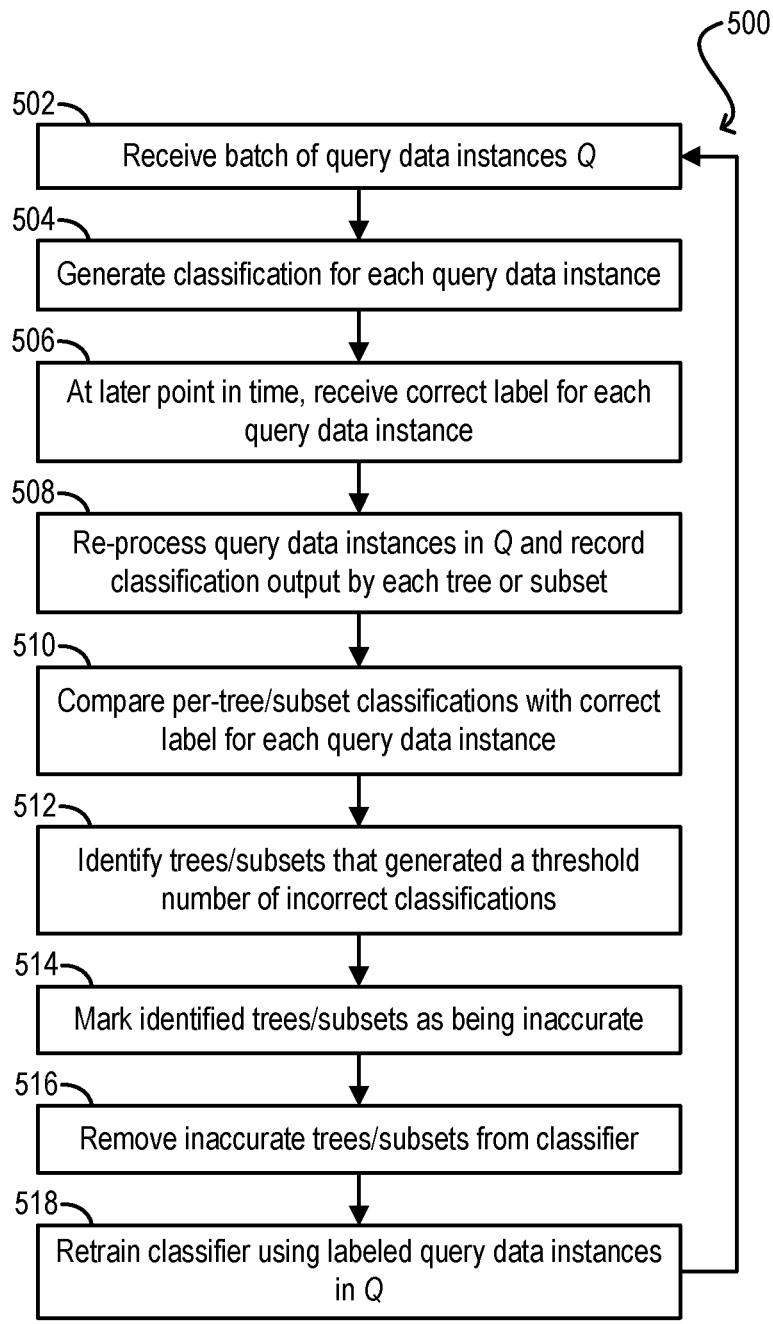
FIG. 5 depicts a workflow for identifying and retraining inaccurate trees/subsets in an online fashion according to certain embodiments.

FIGS. 4 and 5 depicts two workflows 400 and 500 that may be used for identifying and replacing inaccurate trees according to certain embodiments. Workflow 400 of FIG. 4 describes an "offline" approach in which this process is performed on a periodic basis using training (i.e., labeled) data instances. Workflow 500 of FIG. 5 describes an "online" approach in which this process is performed on a continuous basis using query data instances that are received and processed by tree-based ensemble classifier 200.

Starting with blocks 402 and 404 of workflow 400, tree-based ensemble classifier 200 can receive a set of training data instances T and can generate classifications for the training data instances in accordance with classification workflow 300 of FIG. 3. As part of generating these classifications, tree-based ensemble classifier 200 can keep track of the per-tree and/or per-subset classifications output by each decision tree and/or each tree subset of classifier 200.

Tree-based ensemble classifier 200 can then compare the per-tree/subset classifications with the correct label for each training data instance (block 406), identify the trees/subsets that generated a threshold number of incorrect classifications (block 408), and mark the trees/subsets identified at block 406 as inaccurate trees/subsets (block 410).

At block 412, the inaccurate trees/subsets can be removed from classifier 200. Finally, at block 414, tree-based ensemble classifier 200 can be retrained using training data set T, thereby reconstructing the removed decision trees.

Turning now to the online approach of workflow 500, tree-based ensemble classifier 200 can receive a batch of query data instances Q (block 502) and can generate classifications for the query data instances in accordance with classification workflow 300 of FIG. 3 (block 504). Further, at some later point in time, tree-based ensemble classifier 200 can receive feedback indicating the correct labels for the query data instances in Q (block 506).

In response to receiving the correct labels, tree-based ensemble classifier 200 can re-process the query data instances in Q and record the per-tree and/or per-subset classifications output by each decision tree and/or each tree subset (block 508), Tree-based ensemble classifier 200 can then compare the per-tree/subset classifications with the correct label for each query data instance (block 510), identify the trees/subsets that generated a threshold number of incorrect classifications (block 512), and mark the trees/subsets identified at block 512 as inaccurate trees/subsets (block 514).

At block 516, the inaccurate trees/subsets can be removed from classifier 200. Finally, at block 518, tree-based ensemble classifier 200 can be retrained using the labeled query data instances of Q (as well as potentially other labeled data, such as a separate training data set). As indicated previously, in various embodiments workflow 500 can be repeated on a continuous basis as tree-based ensemble classifier 200 receives and processes incoming query data instances, thereby allowing classifier 200 evolve and improve its performance in an online manner throughout its runtime operation.

5. Supporting Parallelism

Classification workflow 300 of FIG. 3 generally assumes that tree-based ensemble classifier 200 operates on query data instances in a serial fashion. However, in certain embodiments classifier 200 may be configured to handle multiple query data instances in parallel, where each query data instance is concurrently processed by a different subset of decision trees 102(1)-(N). For example, assume tree-based ensemble classifier 200 receives a batch of query data instances comprising q1, q2, and q3. In this scenario, classifier 200 may assign q1 to be processed/queried by a first tree subset S1, assign q2 to be processed/queried by a second tree subset S2, and assign q3 to be processed/queried by a third tree subset S3. Thus, this approach allows tree-based ensemble classifier 200 to significantly increase its query throughput rate while consuming the same level of resources as a conventional tree-based ensemble classifier.

6. Extensions for Boosting Predictors

In tree-based ensemble classifiers that are created using boosting methods such as adaptive boosting and gradient boosting, decision trees are trained sequentially according to an error measure determined for the previously trained trees. This means that there is a degree of dependency between the decision trees. For example, in the case of adaptive boosting, these dependencies are quantified by per-tree weight values which indicate the "importance" of each decision tree relative to the others (i.e., how much the tree contributes to the decision process).

For such boosting predictors, in certain embodiments internal load balancer 202 can take into account the cross-tree dependencies at the time of selecting subsets (per, e.g., block 304 of workflow 300). For instance, assume tree-based ensemble classifier 200 is an adaptive boosting classifier, such that each decision tree 102 is associated with a weight w. In this scenario, when selecting a subset S, internal load balancer 202 of predictor 200 can select decision trees such that, e.g., the total combined weight of trees in S (i.e., $w_1+w_2+ \ldots +w_M$) meets some minimum threshold t. These dependency-based criteria can either be used or alone or in conjunction with the various criteria described with respect to block 304 of workflow 300 (e.g., load balancing criteria, tree accuracy criteria, etc.).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   training, by a computer system, a tree-based ensemble classifier using a training data set, the training resulting in a plurality of decision trees within the tree-based ensemble classifier;
   receiving, by the tree-based ensemble classifier, a request to classify a first query data instance using the tree-based ensemble classifier; and
   in response to the request:
      selecting, by the tree-based ensemble classifier, a first subset of the plurality of decision trees for processing the first query data instance, the first subset excluding one or more decision trees in the plurality of decision trees;
      providing, by the tree-based ensemble classifier, the first query data instance as input to each decision tree in the first subset;
      combining, by the tree-based ensemble classifier, per-tree classifications generated by the decision trees in the first subset to generate a subset classification;
      determining, by the tree-based ensemble classifier, whether a confidence level associated with the subset classification meets or exceeds a threshold;
      upon determining that the confidence level meets or exceeds the threshold, outputting the subset classification as a final classification result for the first query data instance; and
      upon determining that the confidence level does not meet or exceed the threshold, repeating the selecting, the providing, the combining, and the determining.

2. The method of claim 1 wherein the first subset is selected:
   randomly from the plurality of decision trees;
   in a manner that balances query load across the plurality of decision trees; or
   deterministically based on content of the first query data instance.

3. The method of claim 1 wherein the first subset is selected based on accuracy of the plurality of decision trees in classifying prior query data instances of a same type as the first query data instance.

4. The method of claim 1 further comprising:
   identifying one or more decision trees in the plurality of decision trees as inaccurate trees that are likely to generate incorrect classifications;
   removing the one or more decision trees from the tree-based ensemble classifier; and
   subsequently to removing the one or more decision trees, retraining the tree-based ensemble classifier.

5. The method of claim 1 further comprising:
   receiving a second query data instance different from the first query data instance; and
   selecting a second subset of the plurality of decision trees for processing the second query data instance, while the first query data instance is being processed via the first sub set.

6. The method of claim 1 wherein the tree-based ensemble classifier is a boosting classifier and wherein the first subset is selected in a manner that takes into account a weight value assigned to each decision tree in the plurality of decision trees.

7. A non-transitory computer readable storage medium having stored thereon program code executable by a tree-based ensemble classifier comprising a plurality of decision trees, the program code causing the tree-based ensemble classifier to execute a method comprising:
   receiving a request to classify a first query data instance using the tree-based ensemble classifier; and
   in response to the request:
      selecting a first subset of the plurality of decision trees for processing the first query data instance, the first subset excluding one or more decision trees in the plurality of decision trees;
      providing the first query data instance as input to each decision tree in the first subset;
      combining per-tree classifications generated by the decision trees in the first subset to generate a subset classification;
      determining whether a confidence level associated with the subset classification meets or exceeds a threshold;
      upon determining that the confidence level meets or exceeds the threshold, outputting the subset classification as a final classification result for the first query data instance; and
      upon determining that the confidence level does not meet or exceed the threshold, repeating the selecting, the providing, the combining, and the determining.

8. The non-transitory computer readable storage medium of claim 7 wherein the first subset is selected:
   randomly from the plurality of decision trees;
   in a manner that balances query load across the plurality of decision trees; or
   deterministically based on content of the first query data instance.

9. The non-transitory computer readable storage medium of claim 7 wherein the first subset is selected based on accuracy of the plurality of decision trees in classifying prior query data instances of a same type as the first query data instance.

10. The non-transitory computer readable storage medium of claim 7 wherein the method further comprises:
    identifying one or more decision trees in the plurality of decision trees as inaccurate trees that are likely to generate incorrect classifications;
    removing the one or more decision trees from the tree-based ensemble classifier; and
    subsequently to removing the one or more decision trees, retraining the tree-based ensemble classifier.

11. The non-transitory computer readable storage medium of claim 7 wherein the method further comprises:

receiving a second query data instance different from the first query data instance; and selecting a second subset of the plurality of decision trees for processing the second query data instance, while the first query data instance is being processed via the first sub set.

12. The non-transitory computer readable storage medium of claim 7 wherein the tree-based ensemble classifier is a boosting classifier and wherein the first subset is selected in a manner that takes into account a weight value assigned to each decision tree in the plurality of decision trees.

13. A computer system comprising:

a processor; and a non-transitory computer readable medium having stored thereon program code that, when executed, causes the processor to execute a tree-based ensemble classifier comprising a plurality of decision trees, the program code comprising code that causes the processor to:

receive a request to classify a first query data instance using the tree-based ensemble classifier; and in response to the request:

select a first subset of the plurality of decision trees for processing the first query data instance, the first subset excluding one or more decision trees in the plurality of decision trees;

provide the first query data instance as input to each decision tree in the first subset;

combine per-tree classifications generated by the decision trees in the first subset to generate a subset classification;

determine whether a confidence level associated with the subset classification meets or exceeds a threshold;

upon determining that the confidence level meets or exceeds the threshold, output the subset classification as a final classification result for the first query data instance; and upon determining that the confidence level does not meet or exceed the threshold, repeat the selecting, the providing, the combining, and the determining.

14. The computer system of claim 13 wherein the first subset is selected:

randomly from the plurality of decision trees;

in a manner that balances query load across the plurality of decision trees; or deterministically based on content of the first query data instance.

15. The computer system of claim 13 wherein the first subset is selected based on accuracy of the plurality of decision trees in classifying prior query data instances of a same type as the first query data instance.

16. The computer system of claim 13 wherein the program code further causes the processor to:

identify one or more decision trees in the plurality of decision trees as inaccurate trees that are likely to generate incorrect classifications;

remove the one or more decision trees from the tree-based ensemble classifier; and subsequently to removing the one or more decision trees, retrain the tree-based ensemble classifier.

17. The computer system of claim 13 wherein the program code further causes the processor to:

receive a second query data instance different from the first query data instance; and select a second subset of the plurality of decision trees for processing the second query data instance, while the first query data instance is being processed via the first subset.

18. The computer system of claim 13 wherein the tree-based ensemble classifier is a boosting classifier and wherein the first subset is selected in a manner that takes into account a weight value assigned to each decision tree in the plurality of decision trees.

* * * * *